July 8, 1969  F. STERZER  3,454,771

CUBIC CRYSTAL LIGHT MODULATOR

Filed Jan. 28, 1966

INVENTOR.
FRED STERZER
BY
Edward J Norton
Attorney

United States Patent Office 3,454,771
Patented July 8, 1969

3,454,771
CUBIC CRYSTAL LIGHT MODULATOR
Fred Sterzer, Princeton, N.J., assignor to Radio Corporation of America, a corporation of Delaware
Filed Jan. 28, 1966, Ser. No. 523,651
Int. Cl. H04b 9/00
U.S. Cl. 250—199                                   4 Claims

ABSTRACT OF THE DISCLOSURE

Means for rotating the angle of polarization of a plane polarized light beam by any desired angle is provided by passing the light beam through a cubic electro-optic crystal in a predetermined direction with respect to the three crystallographic axes of the crystal, while simultaneously applying a first electric field in accordance with a first predetermined function of the desired angle of rotation parallel to one certain crystallographic axis and applying a second electric field in accordance with a second predetermined function of the desired angle of rotation parallel to another certain crystallographic axis. The desired angle of rotation of the plane polarized light beam may be varied in accordance with a frequency modulated signal.

---

This invention relates to optics and particularly to a novel device for rotating the plane of polarization of a light beam.

The potential capabilities of light communication devices including lasers depend to a large extent on the ability to control the characteristics of the light beam. For example, optical communication applications require techniques for varying some characteristic, e.g. intensity, frequency or polarization, of the beam in accordance with a modulating signal. Various techniques for varying intensity and frequency are known to the art. Also, techniques are available for converting plane polarized light to elliptically polarized light. But few techniques have been available for electrically varying or rotating the plane of polarization of a plane polarized light beam.

It is therefore an object of the present invention to provide a novel control device for optical beams.

It is a further object of the present invention to provide a device for electrically varying the plane of polarization of an optical beam.

It is a further object of the present invention to provide a device for rotating the plane of polarization of an optical beam in accordance with a modulating signal.

Briefly, the present invention utilizes a material which is biaxial (i.e. has two optic axes) under certain conditions. A light beam, whose plane of polarization is to be changed, is passed through the material in a predetermined direction with respect to one of the optic axes. The total differential phase retardation between the ordinary and extraordinary components of the beam propagating in the material is maintained at 180° so that a plane polarized beam emerges from the material. Means are provided for varying the direction of the other optic axis with respect to the direction of polarization of the incident beam while the material itself is maintained stationary. As the direction of the non-fixed optic axis, is changed, the plane of polarization of the beam emerging from the crystal is changed.

In a preferred embodiment of the present invention, the material used is a cubic electro-optic crystal in a parallelepiped configuration, such as CuCl (cuprous chloride) or GaAs (gallium arsenide). Electric fields are established along two of the crystallographic axes. The two electric fields are adjusted so that one optic axis is always in the direction of the third crystallographic axis. The incident light beam is directed through the crystal in a direction at 45° with respect to the third crystallographic axis and parallel to the plane defined by the second and third axes. The two electric fields are varied to rotate the direction of the other or second optic axis of the crystal and therefore the plane of polarization of the light beam.

In one embodiment of the present invention the two electric fields are varied in accordance with a frequency modulated information signal. The plane of polarization of the light beam then varies at the frequency of the modulated signal.

A more detailed description of the present invention will be given with reference to the accompanying drawing in which.

Figure 1:
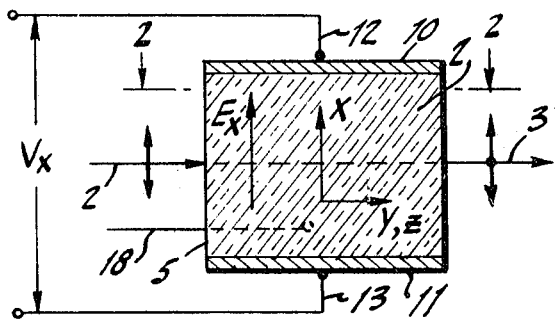
FIG. 1 is a side view in section of an embodiment of a control device constructed according to the present invention.
Figure 2:
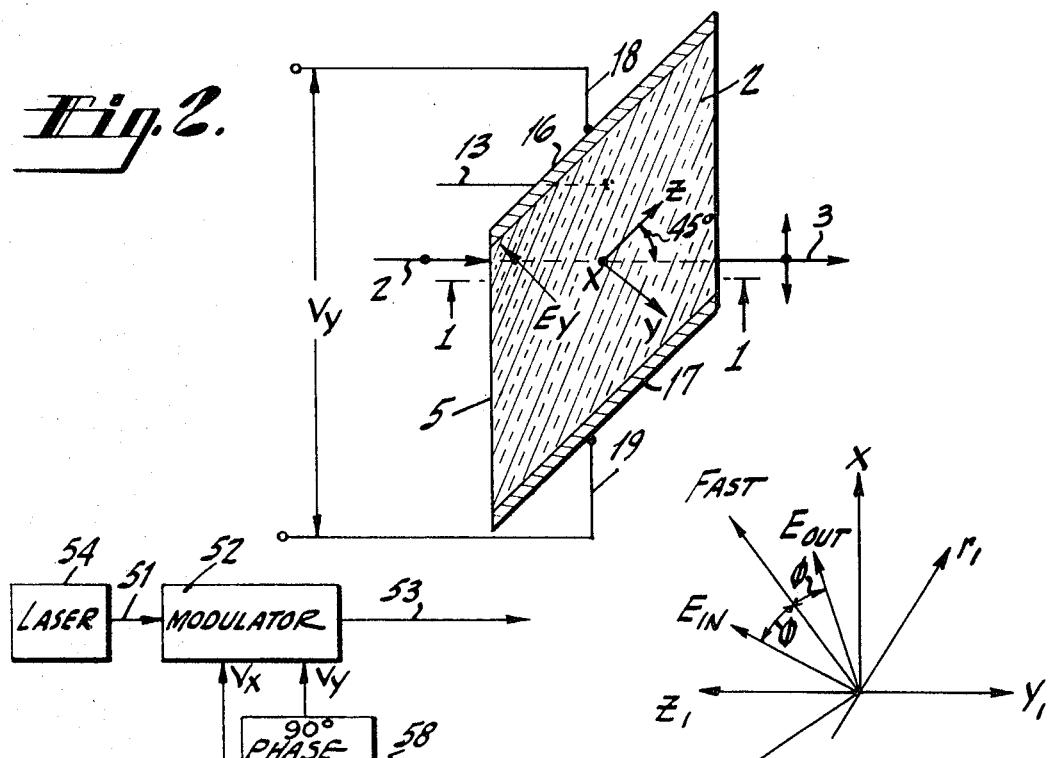
FIG. 2 is a top view in section of the control device shown in FIGURE 1.

FIGS. 1 and 2 ilustrate the construction of a preferred embodiment of a polarization control device according to the present invention. Referring to FIG. 1, a light beam 1, whose plane of polarization is to be varied, is passed from a suitable source such as a laser, not shown, through an electro-optic material 2. The polarization direction indicated by the conventional notation of arrows and dots, of the incident beam 1 is parallel to the paper while that of the emerging beam 3 has two components, one parallel to the paper, the other perpendicular to the paper. Thus, the polarization direction of the emerging beam 3 is angularly displaced from that of the incident beam 1.

Preferably, the electro-optic material 2 is a cubic crystal such as CuCl (cuprous chloride) or GaAs (gallium arsenide) which is transparent to the light beam 1. The crystal 2 is shown as being of a parallelepiped configuration and is arranged so that the direction of the incident light beam 1 is perpendicular to a first crystallographic axis, designated $x$. Referring to both FIGS. 1 and 2 it is noted that the incident light beam 1 enters the crystal perpendicular to the face 5. Also, as shown in FIGURE 2, the direction of the incident beam 1 makes an angle of 45° with respect to the $y$ and $z$ crystallographic axes. Two electrodes 10 and 11 are placed on opposite sides of the crystal 2 perpendicular to the $x$ crystallographic axis. Electric leads 12 and 13 are connected to the electrodes 10 and 11 to enable a voltage, $V_x$, to be applied between the two electrodes from a suitable source, not shown. The corresponding electric field established between the two electrodes 10 and 11 is designated $E_x$. Two additional electrodes 16 and 17 are placed on the crystal 2 perpendicular to the $y$-crystallographic axis. Two electrical leads 18 and 19 are attached to the two electrodes 16 and 17 to enable a voltage, $V_y$, to be applied between the two electrodes. The corresponding electric field established between the two electrodes 16 and 17 is designated $E_y$. The placement of the four electrodes on the crystal 2 is accomplished by conventional techniques. For example, each of the four electrodes may be a gold evaporation.

The voltages $V_x$ and $V_y$ applied to the four electrodes are adjusted to produce a relationship between the two fields $E_x$ and $E_y$ which satisfies the following equation:

$$E_x = E_0 \sin a \qquad (1)$$

$$E_y = \frac{E_0}{\sqrt{2}} \cos a$$

where $a$ is a variable, $$E_0 = \lambda/dr_{41}n_0^3$$

$\lambda$ is the wavelength of incident light beam 1.
$d$ is the pathlength of the light beam 1 through the crystal 2.
$r_{41}$ is the electro-optic coefficient of the crystal 2, and
$n_0$ is the index of refraction of the crystal 2 with no field applied.

Equation 1 indicates that the maximum value of $E_x$ is greater than that of $E_y$. But this is not necessarily true of the two voltages $V_x$ and $V_y$. Since the electric field in the crystal can be expressed as voltage per unit length, if the distance of the crystal in the $y$ direction is $\sqrt{2}$ times that in the $x$ direction, then the maximum values of the two voltages are equal.

With the relationship of Equation 1 maintained, the crystal 2 acts as a half-wave plate in that the total differential phase retardation between the ordinary and extraordinary components of the beam 1 is 180°. This is true for every value of $E_x$ and $E_y$ satisfying Equation 1. Therefore, the beam 3 emerging from the crystal 2 is a plane polarized beam. The change in plane of polarization is given by:

$$\cos \theta = \sin \alpha + \text{constant} \quad (2)$$

where $\theta$ is the change in polarization direction,
$a$ is given in Equation 1, and
the constant term depends on the polarization direction of the incident beam.

The operation of the device of FIGS. 1 and 2 can be described as follows. Since the only electric fields applied to the cubic crystal 2 are along the $x$ and $y$ crystallographic axes, the $z$ axis of the crystal is an optic axis and remains an optic axis for any variation of $E_x$ and $E_y$. This follows from the electro-optic mechanism of cubic crystals. Therefore the direction of the light beam 1 through the crystal 2 always makes an angle of 45° with the fixed optic axis.

The second optic axis of the crystal 1 is in the $x$–$y$ plane and its direction is dependent upon the applied electric fields $E_x$ and $E_y$. More specifically, if $\vec{r}$ is a unit vector along the second optic axis then the direction is indicated by:

$$\vec{r} = \sqrt{\frac{E_y}{E}}\vec{i} + \frac{E_x}{E}\vec{j} \quad (3)$$

where $E = \sqrt{E_x^2 + E_y^2}$ and $\vec{i}$ and $\vec{j}$ are unit vectors along the $x$ and $y$ axes respectively.

As noted above the phase retardation between the extraordinary and ordinary components of the beam 1 in the crystal 2 is always 180° provided the two fields $E_x$ and $E_y$ satisfy Equation 1 above. Thus the crystal 2 acts as a half wave plate and the emerging beam 3 is always plane polarized. As with conventional half-wave plates the plane of polarization of the emerging beam 3 depends on the angle between the polarization direction of the incident beam 1 and the "fast" direction of the half wave plate. The fast and slow directions of the crystal 2 depend upon the fields $E_x$ and $E_y$ established in the crystal 2. In biaxial crystals the planes containing the direction of the light beam and the fast and slow axes are respectively the internal and external bisectors of the angle between the planes containing the direction of the light beam and the first optic axis and the direction of the light beam and the second optic axis. (See for example, Born and Wolf, Principles of Optics, pages 673–678.) This relationship is illustrated in FIG. 3.

Figure 3:
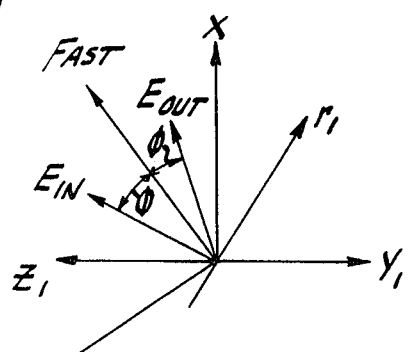
FIG. 3 is a diagram illustrating the operation of the control device of FIGS. 1 and 2.

FIGURE 3 shows the projections of the two optic axes and the fast and slow directions of the crystal 2 in a plane perpendicular to the direction of the light beam 1 through the crystal 2. In FIG. 3, then, the coordinates shown are the $x$ crystallographic axis and the projections of the $y$ and $z$ crystallographic axes on the plane perpendicular to the direction of the light beam 1. These two projections are indicated as $y_1$ and $z_1$. The projection of the variable optic axis direction $\vec{r}$ on the plane perpendicular to the direction of the light beam 1 is indicated as $\vec{r}_1$. The fast direction of the crystal is the bisector of the angle between the projection of the variable optic axis direction, $r_1$, and the projection of the fixed optic axis direction $z_1$. The slow direction of the crystal 2 is the bisector of the other angle between these two projections.

The polarization of the input beam 1 is indicated as $\vec{E}_{in}$ in FIG. 3 and this direction makes an angle designated $\phi$ with the fast direction of the crystal 2. According to the operation of half wave plates, the polarization of the output beam 3, designated $\vec{E}_{out}$ in FIG. 3, also makes an angle $\phi$ with the fast direction of the crystal 2 but on the other side of the fast direction. Therefore, the total change in direction of polarization of the beam is twice the angle between $\vec{E}_{in}$ and the fast direction. As the variable optic axis $\vec{r}$ is rotated in accordance with Equation 3 above, the projection $\vec{r}_1$ is also rotated. Therefore, the fast and slow directions of the plate rotate as the two fields $E_x$ and $E_y$ are varied. The corresponding difference in polarization between the input and output beams is given by Equation 2 above.

Figure 4:
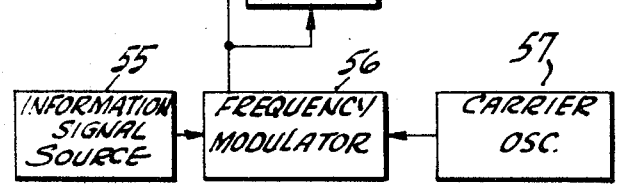
FIG. 4 is a block diagram of a modulation system employing a control device constructed according to the present invention.

The above described control device may be employed to modulate an optical beam in accordance with an information signal. FIG. 4 is a block diagram showing a system for employing the modulator for this purpose. In FIG. 4 a laser 50 generates a coherent optical beam 51 which is passed through a modulator 52 constructed according to the description given above. The output beam 53 from the modulator 52 is a beam whose polarization angle varies in accordance with an information signal supplied to the modulator 52. The system for supplying the information signal to the modulator 52 comprises an information signal source 55 which supplies a signal to a frequency modulator 56 to modulate the frequency of a carrier wave supplied to the modulator 56 by a carrier oscillator 57. The output signal from the frequency modulator 56 is applied to the modulator 52, directly to the $x$ electrodes (10 and 11 in FIG. 1) and indirectly, through a 90° phase shift network 58, to the $y$ electrodes (16 and 17 in FIG. 2).

The voltage generated by the frequency modulator 56 is in the familiar form:

$$V = A \sin (w_c t + \Delta \sin w_m t) \quad (4)$$

where, $A$ is the amplitude of the signal generated by the modulator 56,
$w_c$ is the frequency of the carrier generated by the oscillator 57,
$w_m$ is the frequency of the modulating signal from the source 55, and
$\Delta$ is the frequency deviation which depends on the characteristics of the modulator 56 and the characteristics of the modulating signal from the source 55.

The constant term $A$ in Equation 4 is advantageously fixed at a value equal to the product of the distance, $d_x$, between the $x$ electrodes and $E_0$. Also, the crystal is advantageously cut as described above so that the distance between the $y$ electrodes is $\sqrt{2}$ times the distance between the $x$ electrodes. Therefore the voltages applied to the $x$ and $y$ electrodes of the modulator 52 are given by, $$V_x = d_x E_0 \sin (w_c t + \Delta \sin w_m t)$$
$$V_y = d_x E_0 \cos (w_c t + \Delta \sin w_m t) \quad (5)$$

The corresponding electric fields established in the modulator 52 are simply the voltages given above divided by the distance in the direction between the respective electrodes. Thus:

$$E_x = E_0 \sin(w_c t + \Delta \sin w_m t) \quad (6)$$

$$E_y = \frac{E_0}{\sqrt{2}} \cos(w_c t - \Delta \sin w_m t)$$

The angular variation of direction of polarization of the output beam 53 is given by Equation 2 above. Comparing Equations 1, 2, and 6 and assuming the polarization direction of the incident beam 51 is such that the constant term in Equation 2 is zero, then the change in polarization, $\theta$, of the output beam 53 is given by $$\theta = w_c t + \Delta \sin w_m t + 90° \quad (7)$$

Therefore, the information from the source 55 is contained in the angular frequency deviation of the direction of polarization of the output beam 53.

The information carried by the beam 53 may be detected by employing techniques similar to those employed with conventional polarization modulators. For example, the beam 53 may be passed through a plane polarizer to obtain a light beam whose intensity varies in accordance with the frequency modulated signal from the source 56. This beam may then be converted to an electrical signal by employing a conventional photo-detector. The electrical signal may then be demodulated by a conventional frequency demodulation system.

What is claimed is:

1. Apparatus for electrically rotating the initial polarization direction of a plane-polarized light beam by any given angle $\theta$, said apparatus comprising:
   (a) a block of cubic electro-optic crystal having first, second and third mutually orthogonal crystallographic axes,
   (b) means for propagating said light beam incident on said crystal through said crystal in a predetermined direction which is substantially perpendicular to said first axis and is at substantially a 45° angle with respect to each of said second and third axes, whereby said predetermined direction lies in a plane substantially parallel to said second and third axes; and
   (c) means for operating said crystal as a half-wave plate by applying an electric field to said crystal having a first component $E_x$, substantially parallel to said first crystallographic axis and a second component, $E_y$, substantially parallel to said second crystallographic axis, each of which first and second components has a magnitude defined as follows in accordance with the independent variable $a$:

$$E_x = E_0 \sin a$$

$$E_y[E_z] = \frac{E_0}{\sqrt{2}} \cos a$$

whereby the total differential phase retardation between the ordinary and extraordinary components of the beam propagating in the material is maintained at 180° so that a plane polarized beam emerges from the material where $$E_0 = \lambda / d r_{41} n_0^3$$

$\lambda$ = the wavelength of said light beam incident on said crystal,
$d$ = the distance traveled by said light beam in said crystal,
$r_{41}$ = the electro-optic coefficient of said crystal,
$n_0$ = the index of refraction of said crystal in absence of an applied electric field;

and where $$\cos \theta = \sin a + \text{constant}$$

where said constant has a value determined by said initial polarization direction of said incident light beam with respect to the direction of said mutually orthogonal crystallographic axes of said crystal, whereby a plane-polarized light beam having a polarization direction which is rotated by said given angle $\theta$ with respect to said initial polarization direction emerges from said crystal.

2. The apparatus defined in claim 1, wherein the shape of said crystal block is a parallelepiped having a first pair of parallel faces substantially parallel to the plane defined by said second and third crystallographic axes and a second pair of parallel faces substantially parallel to the plane defined by said first and third crystallographic axes, the faces of said first pair being spaced from each other by a first given distance and the faces of said second pair being spaced from each other by a second given distance, and wherein said means for applying an electric field includes an individual electrode in contact with each face of each of said first and second pair of faces, means for applying a first voltage equal to the product of said first given distance and said first component, $E_x$, of said electric field across the electrodes in contact with said first pair of faces and means for applying a second voltage equal to the product of said second given distance and said second component, $E_y$, of said electric field across the electrodes in contact with said second pair of faces.

3. The apparatus defined in claim 2, wherein said second given distance is equal to said first given distance multiplied by the square root of two, wherein said first voltage is a sinusoidal signal having a predetermined peak amplitude, and said second voltage is a sinusoidal signal which is in phase quadrature with said first voltage also having said predetermined peak amplitude.

4. The apparatus defined in claim 1, wherein said means for applying an electric field include frequency modulating means for providing said independent variable $a$ in accordance with the function:

$$a = w_c t + \Delta \sin w_m t$$

where, $t$ = time,
$w_c$ = carrier phase velocity of the carrier frequency of a frequency modulated signal,
$w_m$ = modulating signal phase velocity of the modulating signal of the frequency modulated signal,
$\Delta$ = the deviation coefficient of the frequency modulated signal, whereby $$E_x = E_0 \sin(w_c t + \Delta \sin w_m t)$$

$$E_y = \frac{E_0}{\sqrt{2}} \cos(w_c t + \Delta \sin w_m t)$$

References Cited

UNITED STATES PATENTS

| | | | |
|---|---|---|---|
| 2,788,710 | 4/1957 | West | 250—199 |
| 3,204,104 | 8/1965 | Baird et al. | 250—199 |
| 3,272,988 | 9/1966 | Bloom et al. | 250—199 |

OTHER REFERENCES

C. F. Buhner et al., Applied Optics, Electro-Optic Light Light Modulation With Cubic Crystals, August 1963, pp. 839–846.

ROBERT L. GRIFFIN, *Primary Examiner.*

ALBERT J. MAYER, *Assistant Examiner.*

U.S. Cl. X.R.

332—7.51; 350—150, 157